United States Patent [19]
Klapman et al.

[11] Patent Number: 5,323,174
[45] Date of Patent: Jun. 21, 1994

[54] DEVICE FOR DETERMINING AN ORIENTATION OF AT LEAST A PORTION OF A LIVING BODY

[75] Inventors: Matthew H. Klapman, 9235 N. Menard, Morton Grove, Ill. 60053; David J. Frerichs, Mountain View, Calif.

[73] Assignee: Matthew H. Klapman, Morton Grove, Ill.

[21] Appl. No.: 984,560

[22] Filed: Dec. 2, 1992

[51] Int. Cl.⁵ ............................................. G09G 5/08
[52] U.S. Cl. .................................. 345/156; 345/184; 273/438
[58] Field of Search ........... 340/700, 706, 709, 825.19, 340/705, 980, 685, 686; 345/156, 184; 273/148 B, 433, 438

[56] References Cited

U.S. PATENT DOCUMENTS

| | | | |
|---|---|---|---|
| 3,229,059 | 1/1966 | Beatty | 273/438 |
| 4,159,474 | 6/1979 | Wooldridge | 340/686 |
| 4,565,999 | 1/1986 | King et al. | |
| 4,682,159 | 7/1987 | Davison | |
| 4,688,037 | 8/1987 | Krieg | |
| 4,737,773 | 4/1988 | Kobayashi | 304/706 |
| 4,884,219 | 11/1989 | Waldern | |
| 4,954,815 | 9/1990 | Delmonte | |
| 4,956,794 | 9/1990 | Zeevi et al. | |
| 4,984,179 | 1/1991 | Waldern | |
| 5,038,144 | 8/1991 | Kaye | 340/706 |
| 5,068,645 | 11/1991 | Drumm | |
| 5,130,794 | 7/1992 | Ritchey | |
| 5,142,506 | 8/1992 | Edwards | |
| 5,229,756 | 7/1993 | Kosugi et al. | 273/438 |

Primary Examiner—Jeffery Brier
Attorney, Agent, or Firm—Welsh & Katz, Ltd.

[57] ABSTRACT

A device used for measuring the orientation of a human head about one or two axes and converting that information into an electrical signal in the analog or digital domain includes a headset and includes one or two electromechanical orientation sensors which provide an electrical signal that corresponds to the orientation of the head without any reference to an off-of-the body reference. The orientation sensor includes a signal generating device, such as a variable resistor, coupled to the torso of the user via a mechanical linkage. As the head moves, the linkage moves and changes the resistance of the variable resistor. The change in resistance corresponds to the orientation of the head. One orientation sensor is used to measure the horizontal, or lateral angle, of the head with respect to the torso, or shoulder blades. Two orientation sensors mounted on each side of the head measure both the lateral and vertical angles of the head with respect to the torso, or shoulder blades. Also disclosed is a single sensor having two signal generating devices wherein one signal generating device detects primarily lateral movement while the other signal generating device detects primarily vertical movement.

21 Claims, 5 Drawing Sheets

DEVICE FOR DETERMINING AN ORIENTATION OF AT LEAST A PORTION OF A LIVING BODY

A portion of the disclosure of this patent document contains material which is subject to copyright protection. The copyright owner has no objection to the facsimile production by anyone of the patent document or the patent disclosure, as it appears in the Patent and Trademark Office patent file or records, but otherwise reserves all copyright rights whatsoever.

BACKGROUND OF THE INVENTION

The invention relates generally to position and/or orientation sensing devices and more particularly to devices for facilitating the tracking of a head or other movable object.

Various devices are known for measuring the orientation of the head (head tracking). Head tracking finds many useful applications. For example, the military uses head tracking to aim gun turrets and to provide heads-up tactical information for the pilot of an aircraft. The private sector uses head tracking as a third hand to allow a handicapped individual to steer a motorized wheelchair, or to allow an individual to manipulate a cursor on a computer screen.

Another application includes the use of head tracking to provide a virtual environment for the user—generally known as "virtual reality". Teachings of such application may be found in U.S. Pat. Nos. 4,984,179 (Waldern); 4,884,219 (Waldern); and 5,130,794 (Ritchey). "Virtual realty" describes the host of applications that involve the use of a virtual environment to allow human-machine interaction at a more intuitive level than by typing commands on a keyboard or using a mouse-type device to communicate with a machine. Head tracking is necessary to generate a first-person virtual environment. Typically, the user wears video screens over both eyes and a host computer generates three-dimensional views that correspond to the position of the user's head.

With many known systems, a fixed reference point is compared with the position or orientation of the head by linking the head to the fixed reference point by way of mechanical linkage, optic linkage, ultrasonic linkage, or magnetic linkage, and measuring the position or orientation of the head relative to that fixed reference point. Such systems are described in U.S. Patent Nos. 4,954,815; 4,565,999; 4,682,159; 5,142,506; and 4,688,037. However, a problem arises with such known head tracking devices since the fixed reference point is off of the body and requires the use of an off-the-body transmitter and receiver configuration that limits the user to a confined space because of the limited range of the transmitters. Known mechanical linkage systems also constrain the user.

The transmitter-receiver configurations typically have a freedom of movement advantage over the mechanical linkage systems but generally require more time to process the received electromagnetic signals before the position/orientation information may be output from the device. This time is referred to as latency or lag time. The off-body mechanical linkage provides almost instantaneous output, or negligible lag time, but severely limits the movement range of the user. Furthermore, such systems tend to be complex and subsequently costly to manufacture and use.

Another device, such as that disclosed in U.S. Pat. No. 5,068,645, offers an advantage over the off-the-body link by using gravity as its fixed reference point and therefore contains only a receiver mounted on the headset. This device is relatively non-restrictive to the user since gravity exists everywhere on the earth. However, such a device may not be readily used in low gravity applications or non-gravity applications such as in outer space. Secondly, this device may be prone to a pendulum effect. The device measures the head position by comparing the orientation of the head to the surface level of a liquid in a spherical container. The liquid's surface stays level due to gravity while the user's head tilts the spherical container. However, the liquid will not stay perfectly level because of inertia, but will rock back and forth when the user's head moves quickly. Such a pendulum effect may hinder the performance of this device. Thirdly, such a device typically only measures the head's angle along a vertical axis. It cannot measure the head's lateral movement along a second axis. Consequently there exists a need for a head tracking device which overcomes the disadvantages of the aforementioned prior art devices.

SUMMARY OF THE INVENTION

It is an object of the present invention to provide a relatively simple and inexpensive head tracking device that has negligible lag time similar to conventional mechanical linkage devices while allowing more freedom of movement than the transmitter-receiver pair devices and the conventional mechanical linkages.

It is a further object of the invention to provide a head tracking device that affords lateral as well as vertical tracking.

Yet another object of the invention is to provide a head tracking device for the control of cursor movement or virtual image movement that generates an output to a host computer in the form of relative incremental head movements.

A further object of the invention is to provide a head tracking device which outputs head position information to a host computer in the form of an absolute measurement.

It is yet a further object of the invention to provide a head tracking device which allows a user to interact with the head tracking control to initialize a plurality of predetermined boundary ranges which may be used to scale position measurements to allow a larger or smaller displacement of cursor movement, or other object movement, connected to the head tracking device.

The disclosed head tracking device tracks the orientation of at least a portion of an object, such as the head, with respect to a reference point on the object, such as the torso or upper body area of a user. The present invention is a novel device used to determine the orientation of the head along one or two axes. The invention includes a headset worn by the user containing an orientation sensor that determines the angular displacement of the head relative to the torso or shoulder blade of the user through an electromechanical linkage.

In a preferred embodiment, the electromechanical linkage includes a flexible rod, such as a plastic whip and attachment device that may be fastened to a user's torso area and extends to a T-joint that is fastened to a signal generating device, such as a shaft of a potentiometer (variable impedance device), a rotary optical encoder or other suitable signal generating device. The signal generating device is fastened to the headset. The flexible rod contains a clasping device on one end that attaches to the user's clothing or other surface coupled to the user. Another end of the rod reciprocates freely through the T-joint. When the user's head rotates left, right, up or down, the plastic flexible rod moves and rotates the shaft of the variable resistor which corresponds to the rotation of the head.

The variable resistor may be interfaced to the digital domain through the use of an analog-to-digital converter. This quantized digital value is then processed by a host computer to control the movement of a cursor or movement of a vertical image or other selected mechanism. The computer compensates for any physical discrepancy that exists from user to user through a compensation method.

When one orientation sensor is used, lateral head tracking is accomplished. In this configuration, it is necessary that the movement of the shaft of the variable resistor is minimized when the user's head rotates up or down. This is accomplished by the flexible rod since it is free to move up and down in the T-joint.

When two orientation sensors are provided on each side of the user's head, lateral and vertical orientation of the head can be simultaneously measured. The computer reads the value of each variable resistor and can determine the orientation of the user's head by comparing the two values.

In another embodiment, an additional signal generating device, such as a slide potentiometer or slotted flexible rod with an optical sensor for detecting vertical movement, is added to the single orientation sensor to facilitate detection of movement along both the vertical and lateral axes.

One compensation method is disclosed which requires user interaction to set boundary positions to define a user's selected range of movement. The computer configures the tracking system for each user by executing a software calibration program before the user uses the head tracker in an application. The method includes the steps of measuring position signals, such as voltage drops across the variable resistor, when the user's head is turned to a plurality of boundary or reference positions, then adjusting each value measured by applying a process that utilizes the memorized parameters.

The latency, or lag time, between the digitizing of the variable resistor's value, applying the adjustment method and outputting a final value is negligible since it is below the noticeable threshold value of lag time that may be approximately 50 msec.

DESCRIPTION OF THE PREFERRED EMBODIMENTS

Figure 1:
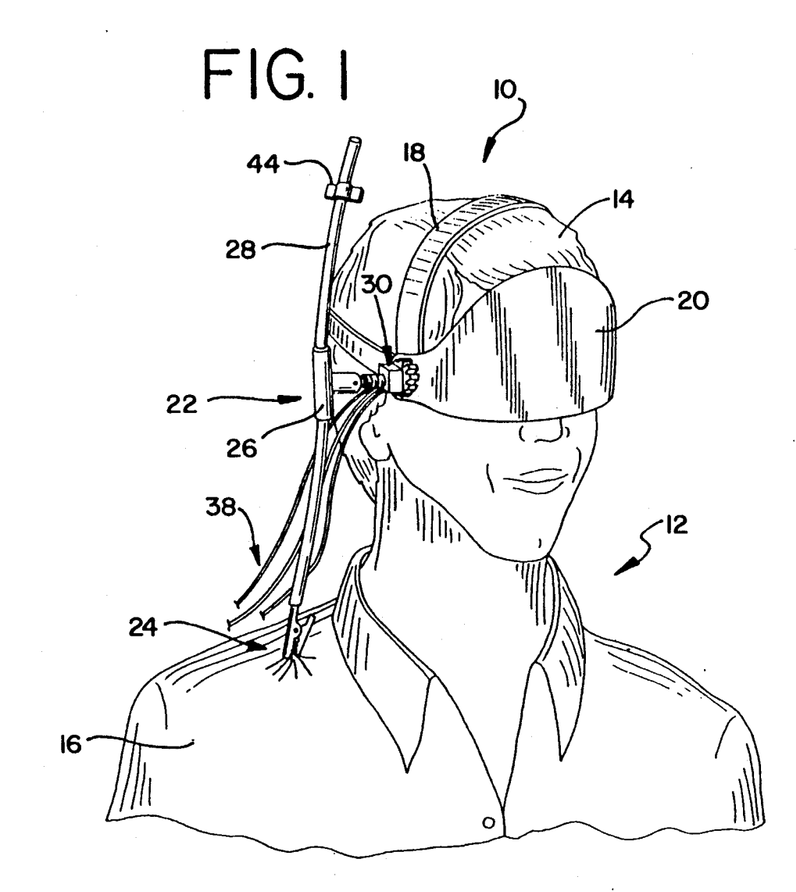
FIG. 1 is a perspective view of a user wearing an orientation sensing device for tracking lateral head movement in accordance with the invention.

FIG. 1 illustrates a preferred embodiment of a head tracking device 10 worn by a user 12 about the head 14. For purposes of discussion, since the head 14 generally moves with respect to the torso area 16, shoulder blade or upper body area, head movement from left to right or right to left will be considered lateral movement along one axis whereas head movement in a vertical, up and down direction will be considered as longitudinal movement along a second axis.

The head tracking device 10 includes a housing 18 for attaching to the movable portion of the object, such as the head 14. The housing 18 may be a headset which in the case of a virtual reality application may have a visor 20 containing a plurality of video display screens (not shown).

The head tracking device 10 further includes an orientation sensing mechanism 22 or position sensor, such as an electromechanical linkage configuration, connected to the housing 18 and having an attachment portion 24 adapted for attachment to a reference portion of the object, such as the torso 16. In the case of a person, the torso may be considered a substantially non-movable portion with respect to the head.

Figure 2:
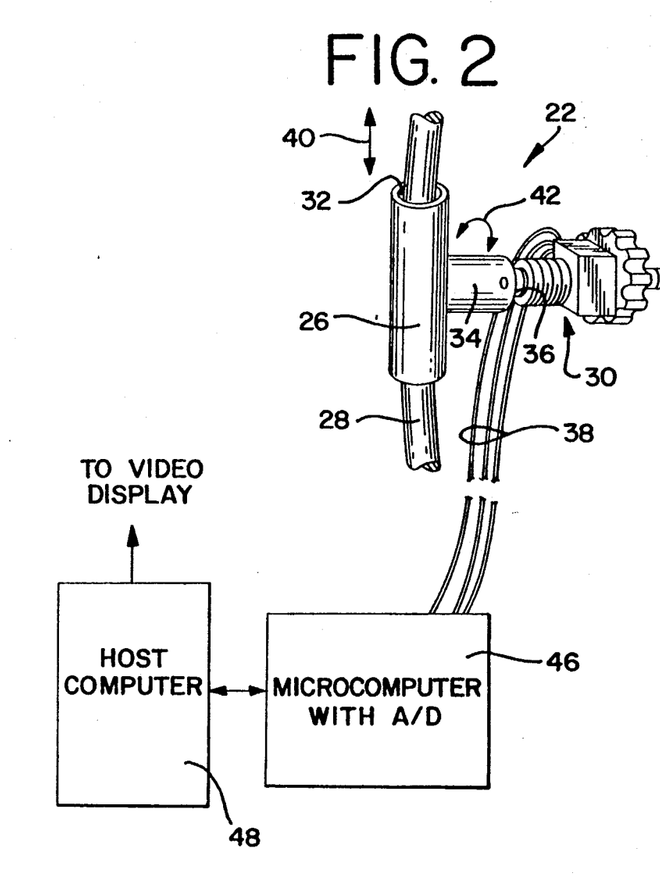
FIG. 2 is a cutaway perspective view of an orientation sensor as shown in FIG. 1 in accordance with the invention.

The attachment portion 24 connects to connecting member 26, such as a T-joint sleeve, through a flexible rod 28. For purposes that will become apparent later, the flexible rod should be made from a material having sufficient memory, such as thermoplastic, so that the rod returns to an original shape after flexing. The connecting member 26 attaches to a signal generating device 30, such as a rotary potentiometer (variable resistor) or optical rotary encoder, and responds to movement of flexible rod 28 to actuate the signal generating device 30. As shown in FIG. 2, the connecting member 22 may be a hollow T-joint having a channel 32 through which the flexible rod 28 may reciprocally slide, and a base 34 for rotatably connecting to a shaft 36 on the signal generating device 30. The signal generating device 30 may be a rotationally adjustable 1K variable potentiometer having three connecting leads 38 as known in the art. It will be recognized that the signal generating device 30 may be another type of variable impedance device or any other suitable signal generating device such as a variable intensity optic sensor or the like.

The direction of reciprocation of the flexible rod 26 is shown by arrow 40 whereas the rotational movement to vary the resistance of the potentiometer is shown by arrow 42. The cross-sectional shape of the flexible rod 28 and the inside cross-sectional shape of the channel 32 are formed to facilitate sliding of the rod 28 through the channel 32 during longitudinal movement of the user's head while providing suitable clearance to facilitate rotation of the potentiometer shaft 36 during lateral movement.

The flexible rod 28 may include an adjustable stop member 44 adapted for slidable adjustment along the length of the flexible rod 28. The stop member 44 may be coupled distal the attachment portion 24 to prevent the flexible rod 28 from sliding entirely through the connecting member 26 when the user puts the headset on or removes the headset.

The signal generating device 30 connects to a microcomputer 46 which contains an 8 bit analog-to-digital (A/D) converting circuit to convert the analog signal to a digital signal as known in the art. The microcomputer may be a Motorola 68HC11 microcomputer which has on-board ROM and RAM so that the microcomputer 46 may be suitably programmed. The microcomputer 46 may be programmed to communicate via a standard protocol to a host computer 48 to emulate a mouse. In the case of a virtual reality system, the host computer 48 may generate the image information to be communicated to the display screens on the visor 20 in response to head orientation information as provided by the microcomputer 46. Where the head tracking device is employed to facilitate cursor movement on a display screen, the host computer 48 may be a personal computer or other device utilizing a video display screen.

The attachment portion 24 includes a suitable clasping device or attachment device adapted to attach to a relatively non-movable portion of the object. For example, the attachment device 24 may be an alligator-type clip 24a, a VELCRO ™ attachment pad (not shown), or an inverted "U" member 24b adapted to rest on the shoulder (shown in FIG. 7) which may couple to the clothing, outer wear, or body of a user.

The flexible rod 28 should be of a flexible nature to allow relatively free movement of a user's head. For example, an unsuitably rigid rod may restrict the lateral movement of the user.

In operation, the user may rotate the head laterally along one axis which will, in turn, cause the flexible rod 28 to push against the connecting member 26, thereby causing the connecting member 26 to rotate as indicated by arrow 42. During such lateral movement, the flexible rod 28 is also allowed to reciprocate through the channel 32 of the connecting member 26 to facilitate freer movement of the user's head. However, vertical movement of the head will also cause the connecting member 26 to be slightly rotated by the flexible rod 28. Consequently, only a single orientation sensor 22 (as shown in FIG. 1) may be needed for head tracking along a single lateral axis.

Figure 3:
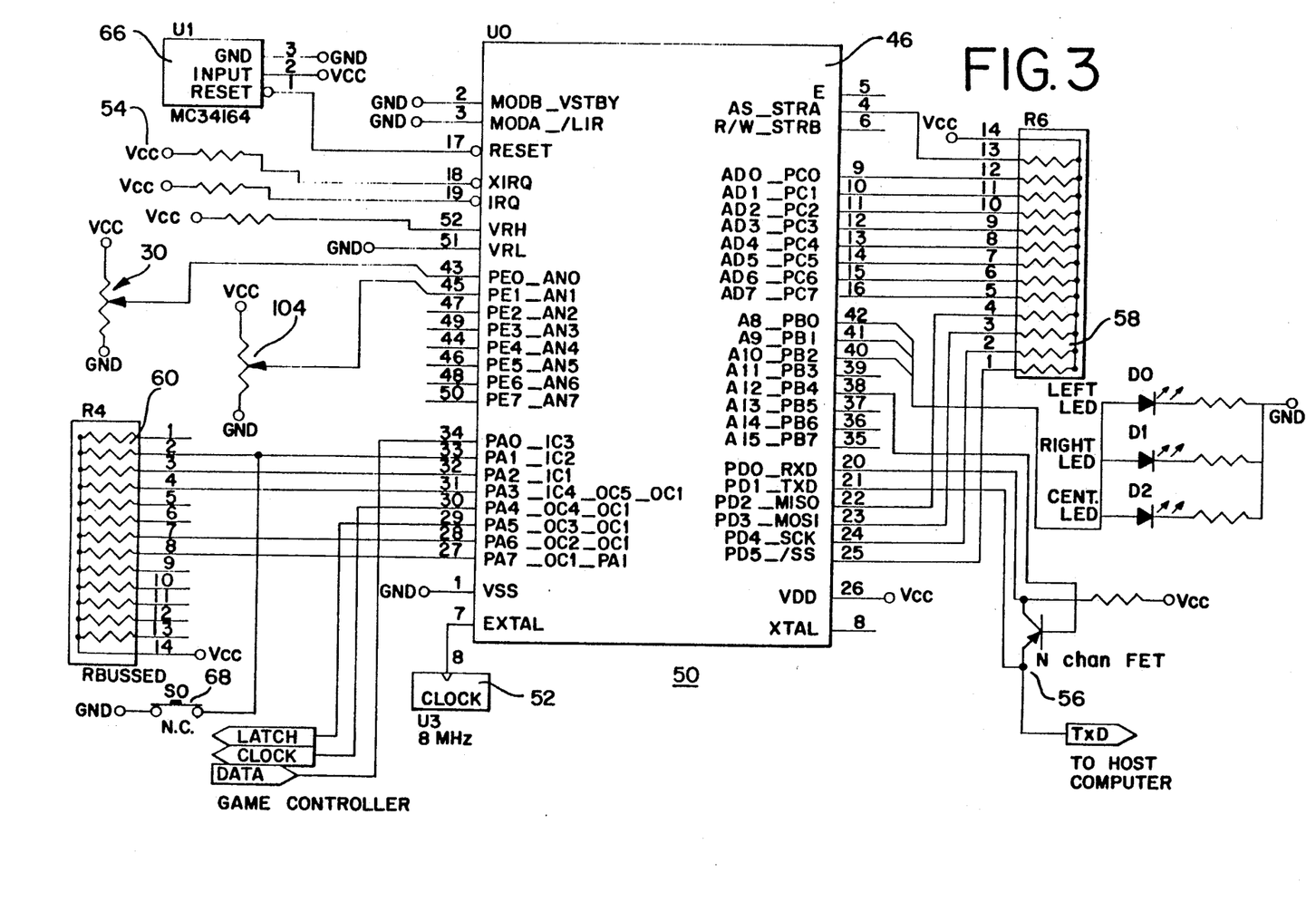
FIG. 3 is a schematic diagram of the orientation sensor connected to a computing device to emulate a mouse or interface with a video game controller.

FIG. 3 schematically illustrates a head-tracking control circuit 50 which includes the microcomputer 46 connected to the signal generating device 30 to determine the orientation of the head. The microcomputer 46 also communicates with the host computer 48 via EIA RS-232A protocol using a plurality of bidirectional ports (PDO and PDI). The control circuit 50 includes a clock 52 for supplying timing pulses to the microcomputer 46 and a transistor 56 such as an N-Channel FET, for use to receive information during RS-232 communication.

A plurality of visual indicators (LED's) D0, D1 and D2 connect to the microcomputer 46 and are activated to indicate the reference or boundary positions as selected by the user, such as the left-most position of the user's head, the right-most position of the user's head, and the center position of the user's head. The LED's D0, D1 and D2 may be mounted on the visor 20 so that the user can tell when he has reached the lateral position limits of the head tracking system or may be mounted externally to the headset. Such visual feedback to allow a user to set boundary positions may also be carried out on screen (display devices on the visor in the case of a virtual reality application) via computer control or may not be necessary where such boundary positions are predetermined.

A plurality of resistors 58 and 60 serve to terminate pins on the microcomputer 46 as known in the art. A reset integrated circuit 66, such as a Motorola MC34164 serves to provide a reset condition during power-up but may not be necessary with another suitable type of computing device.

As shown, a first connecting lead of the potentiometer (variable resistor) may be connected to a power supply, a second connecting lead may be connected to a ground return line, and a signal connecting lead may be connected to an A/D input port on the microcomputer 46. Where two orientation sensors are used (best seen in FIG. 7), a second sensor 102 may be connected to the microcomputer by connecting the first connecting lead of each potentiometer in common on the headsets and connecting the second connecting leads in common so that only the signal connecting lead from the second sensor 102 needs to be connected to the externally mounted microcomputer 46.

The tracking device may be used with a number of different methods for determining the orientation of the user's head to control a cursor or otherwise move a virtual image or machine such as a medical operating instrument. One method outputs the relative change of the user's head orientation to a control device such as the host computer while another method outputs an absolute value corresponding to the orientation of the user's head.

Figures 4, 5:
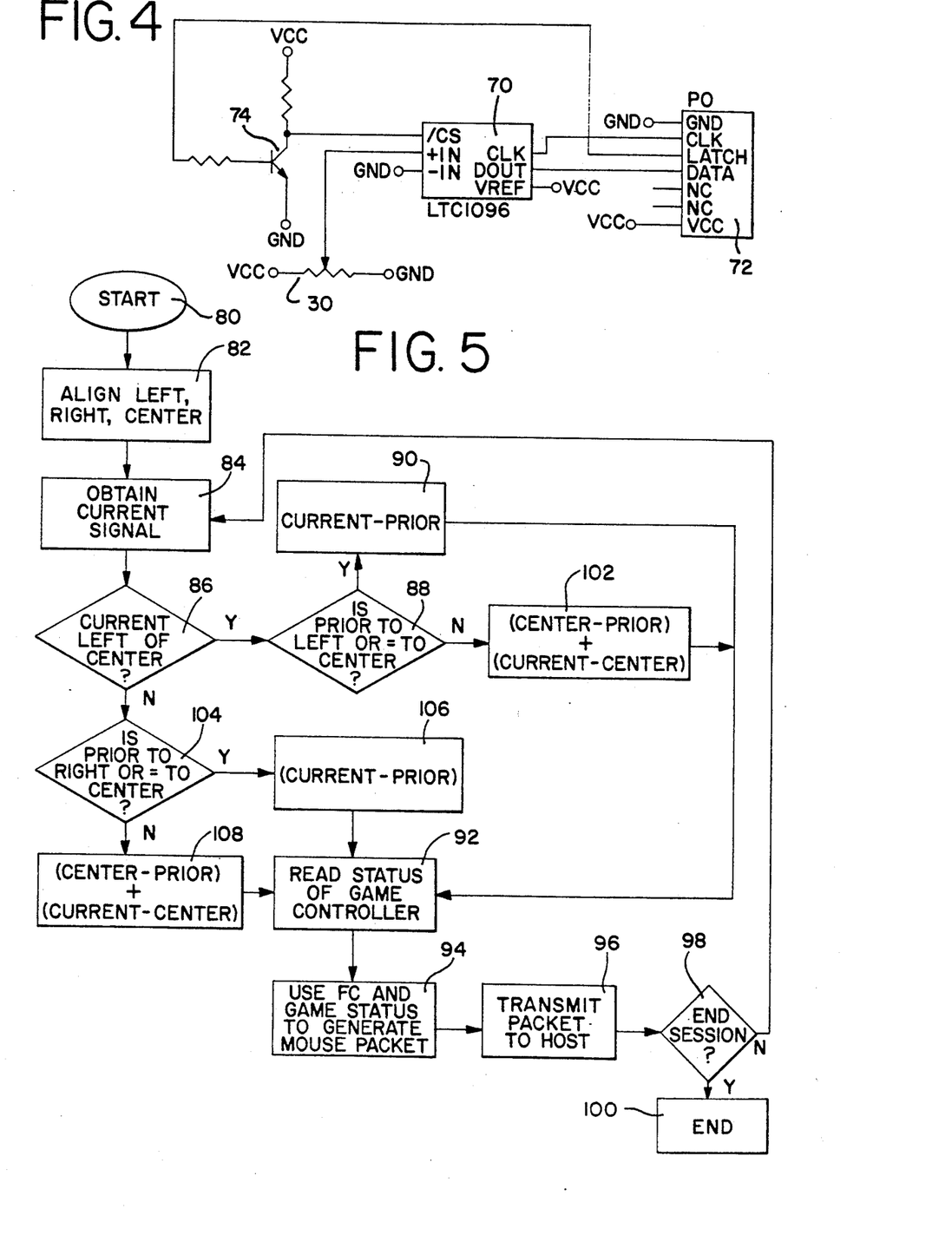
FIG. 4 is a schematic diagram of the orientation sensor connected to serial A/D chip to interface to a video game.
FIG. 5 is a flow chart generally illustrating the process of emulating a mouse using the orientation tracking device in accordance with the invention.
Figure 6:
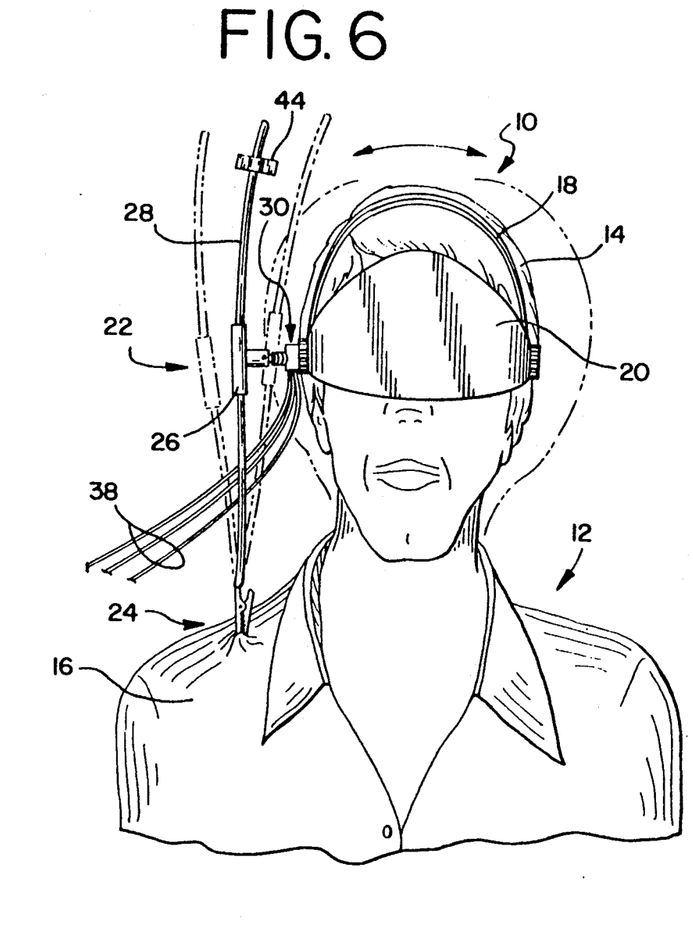
FIG. 6 is a perspective view of a user wearing the inventive tracking device and turning his head laterally in either direction to illustrate the flexing action and rotation of the connecting member of the orientation sensor in accordance with the invention.

FIG. 4 schematically illustrates the use of the tracking device 10 as interfaced with a video game. The signal generating device 30 connects to an A/D integrated circuit 70, such as an LTC1096 which converts the analog voltage generated by the signal generating device 30 into a digital position value. The position value is communicated to a game connector 72 which interfaces with a game controller (not shown). The game controller carries out the necessary computing so that the microcomputer 46 is not needed. A transistor 74 connected to the latch output from the controller serves as a signal inverter which is needed in this case to interface with a NINTENDO ™ game unit (not shown). The A/D converter 70 converts the position signal to a digital signal and transmits the digital signal to the game controller for its use in determining the movement of the cursor or image.

FIG. 5 is a flow diagram generally indicating a method of determining the relative change of head orientation that may be used by the computer 46, or host computer, to determine the lateral orientation of the head and control the position of a cursor on a screen. The process compensates for physical variances between user's head movement ranges, e.g. users having different maximum and minimum angular displacements in the lateral direction.

In block 80 the method starts by initializing the microcomputer 46 or otherwise setting the appropriate inputs to a level to begin head tracking. After the system has been initialized, an alignment process begins as shown in step 82. The alignment process starts with the user defining a range of lateral head movement. The microcomputer 46 activates an indicating device such as D0 to inform the user to move his head to a left boundary position. The user moves the head to a desirable left boundary position and activates the pushbutton switch 68. The microcontroller 46 reads the voltage value from the signaling device 30 to determine a left boundary value. Next, the microcomputer 46 activates D1 to inform the user to move his head right, to a selected right boundary position. The user then activates the pushbutton switch 68 to set the right boundary value.

In a like manner, a center LED, D2 is lit by the microcomputer 46 to inform the user to move his head to a center position and activate the pushbutton switch 68 to set the center boundary value. With reference to moving a cursor, the microcomputer through communication with the host computer, determines the number of postion segments or "mickeys" (a term used when referring to mouse usage) between the left boundary and the center boundary. This corresponds to the number of cursor postiions from a half-screen to the left of the screen. In a like manner, the computer also divides the range from the right to the center boundary position to determine a number of position segments between the center position and the right position. This corresponds to the number of cursor movements per half-screen from the center of the screen to the right of the screen.

In step 84, the user moves his head to a current position. Next, the microcomputer 46 determines whether the voltage reading corresponding to the current position is left of center as shown in step 86. If the current value is left of center, the microcomputer 46 determines whether the prior position was left or equal to center as shown in step 88. If the prior position signal was left or equal to center, the current position value is subtracted from the prior position value to give a relative change in position value as indicated in step 90. This change in position value is then stored in a register after which time a read status signal from the game controller is acquired as shown in step 92. The change in position value as determined in step 90 is then used in step 94 to generate a packet of information understood by the control device or host computer. The change in position value is then transmitted in the form of a packet to the host computer as shown in step 96. If the user no longer wishes to use the head tracking device, the user may then indicate an end session as shown in step 98 whereafter the microcomputer 46 will stop and the process ends as shown in step 100. However, the process may continue continuously to give a current position reading of the user. Consequently, the microcomputer 46 will obtain a current signal in step 84 and repeat the orientation determination process.

Referring back to step 88, if the current signal value is left of center, but the prior signal was not left or equal to center, then the computer computes a change in position value equal to the center value minus the prior value plus the current position minus the center position as shown in step 102. This information is then sent back to the host in a packet of information as previously described. Where the current position is not left of center, the computer determines if the prior signal is to the right or equal to center as shown in step 104. Where the prior signal is to the right or equal to center, the change in position value as shown in step 106 is determined by subtracting the current value minus the prior value. However, where the prior value from step 104 is not to the right or equal to the center value, the change in position value is determined by subtracting the prior value from the center value and adding the result to the subtraction of the current value minus the center value as shown in step 108. Consequently, the aforedescribed method generates a relative change in relative position signal instead of an absolute position indication signal.

To accommodate different applications, the change in position value determined by the method shown in FIG. 5 may be scaled by a suitable scaling value to facilitate disproportional movement between a user's head and the controlled unit such as the cursor, image, or a machine. A user may wish to amplify or attenuate the position moved by the user based on a desired amplification or attenuation scheme. For example, where the user desires a large change in head position to result in small change in cursor movement, the change in position value may be scaled down and consequently attenuated so that the control device or video display device will not move the cursor in a proportional manner. Conversely, where the user desires a small movement of the head to result in a large movement of the cursor or virtual image, the resulting value from the method in FIG. 5 may be amplified before being sent to the control device to transform the small movement in the head to a large movement of the cursor.

It will also be recognized by those skilled in the art that the use of determining a center position may be unnecessary where a less accurate position value would be suitable. Conversely, it will also be recognized that an increased number of predetermined boundary values may also be used to get a more accurate position determination. For example, instead of using three boundary values corresponding to the left, center and right positions, a system may use four or more predetermined boundary positions to get a more accurate reading of the lateral displacement throughout the complete displacement range.

Another orientation detecting method which may be incorporated with the orientation sensor 22, may be referred to as an absolute position indication method. In such a method, the predetermined range defined by the position boundary parameters may be represented as a digital number from 0 to 255 such that each incremental movement corresponds to a 1/256 of the range. Hence a voltage reading corresponding to the current position will be converted be the A/D connecting circuit and used as the absolute position value to indicate the current position of the head. Therefore, the microcomputer 46 need not go through the subtraction process of FIG. 5 to determine a change in position value which is sent to the host computer. Such a method may be suitable for controlling a cursor in a game.

Figure 7:
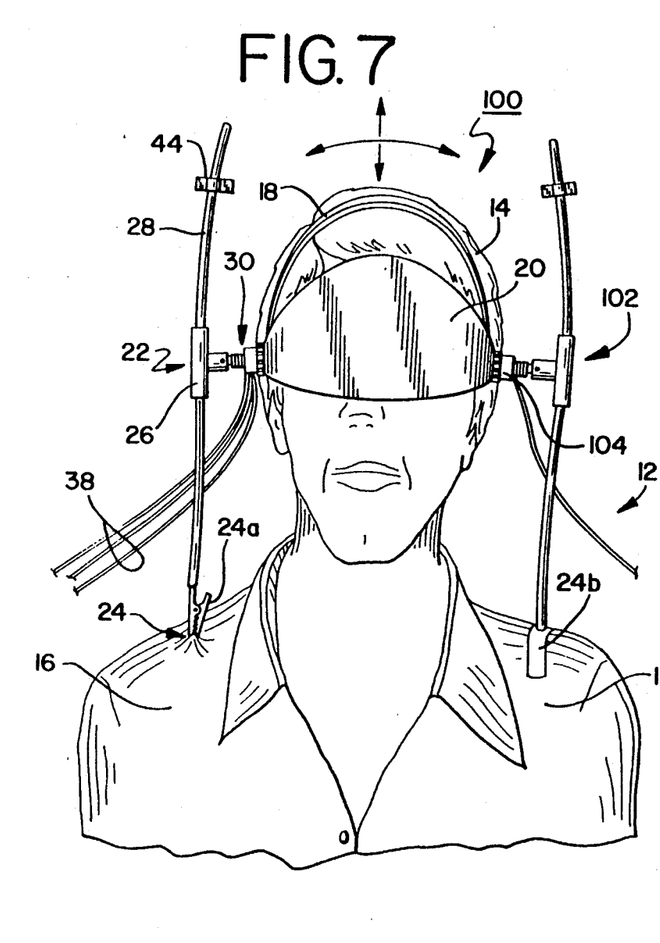
FIG. 7 is a perspective view of a user wearing two orientation sensors to facilitate lateral and vertical orientation tracking in accordance with the invention.

FIG. 7 illustrates a head-tracking device 100 which incorporates two position sensors 22 and 102 to provide both lateral and vertical head tracking. The second position sensor 102 is substantially identical to that of position sensor 22 shown in FIG. 2. The two orientation sensors 22 and 102 are attached to the housing 18 on either side of the user's head approximate the temple area. It has been found that the sensors 22 and 102 should be as close to the center line of the head as possible to obtain a more linear output from the sensors. However, practical considerations such as comfort of the user should also be taken into account.

The second orientation sensor 102 includes a signal generating device 104 substantially identical to that of the orientation sensor 22. Both signal generating devices 30 and 104 are connected to the microcomputer 46 as shown in FIG. 3 to provide head orientation signals to the microcomputer 46.

In operation, the microcomputer 46 receives input signals from each of the signal generating devices 22 and 102. It has been found that each of the sensors may be actuated during movement. Consequently, not all head positions generate unique position values. However, it has also been found that a small range of head movement may generate corresponding values that are unique for each position. Therefore, a one to one correspondence between the range of head movement and the range of cursor movement may be facilitated through scaling as previously described. For example, the microcomputer 46 may scale the small range of unique values so that the small range of movement corresponds with complete coverage of the entire area of the display screen. Thus, a small movement of the head may be transformed into a large movement of the cursor.

Figure 8:
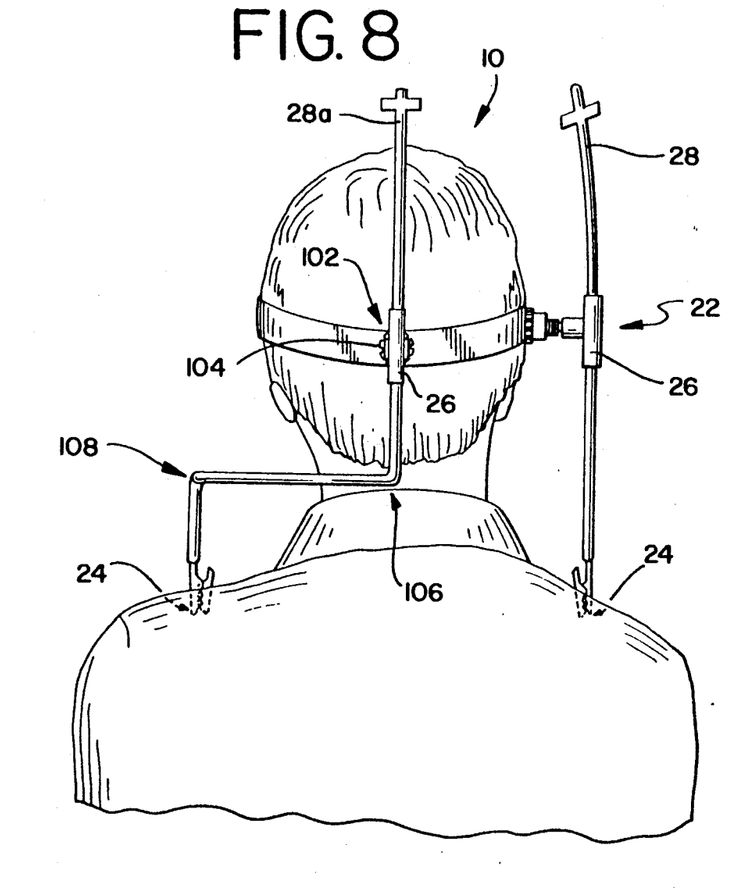
FIG. 8 is a perspective view of a user wearing one orientation sensor of FIG. 2 on the temple area and another orientation sensor of FIG. 2 on the back of the head to facilitate lateral and vertical orientation tracking in accordance with the invention.

FIG. 8 shows a different location for the two orientation sensors 22 and 102 wherein one orientation sensor 102 is positioned in the back of the head along the center line of the head and the other sensor 22 remains proximate the temple area. The placement of the sensor 102 in the back of the head along the center line of rotation affords more mutually exclusive position values for a wider range of head movement. When the user moves the head in the lateral direction, both sensors 22 and 102 are actuated. When the user moves the head in the vertical direction, the flexible rod 28a in the sensor 102 slides through the "T"-joint and does not significantly actuate the signalling device 104. As a result, more unique position values may be obtained with this configuration. As shown, the flexible rod 28a may include a plurality of angles 106 and 108 to allow the user to attach the flexible rod to the torso area of the user.

Figure 9:
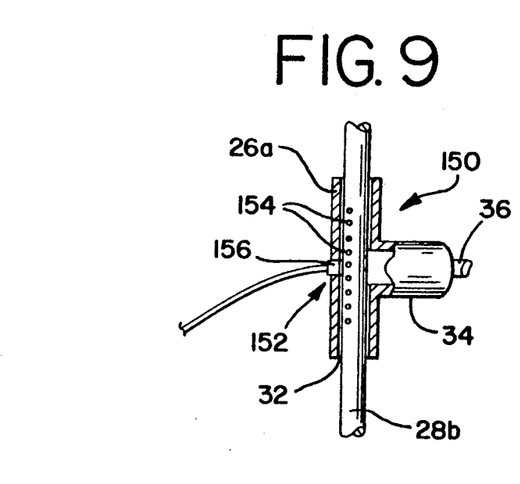
FIG. 9 is an partial cross-sectional view of another embodiment of an orientation sensor to facilitate lateral and vertical orientation tracking in accordance with the invention.

FIG. 9 depicts a portion of a single orientation sensor 150 for measuring both lateral and vertical movement. The sensor 150 includes an additional signal generating device 152 for detecting reciprocating movement of the flexible rod 28b during head movement. The flexible rod 28b has a plurality of apertures 154 extending a suitable length along the rod. The signal generating device 152 may be an optical reflectance sensor 156 coupled to the microcomputer 46 and positioned in the connecting member 26a adjacent the channel 32 to direct a beam of light onto the flexible rod 28b. The apertures 154 serve to change the amount of optical energy reflected by the rod 28b and received by the reflectance sensor as the rod 28b reciprocates through the channel 32. Such reciprocating movement tends to be greatest when the user moves the head along the vertical axis. Hence, vertical movement may be readily distinguished from lateral movement. The size of the apertures 154 may gradually increase or decrease along the rod so that the direction (up or down) of the user may be readily ascertained.

Other types of signal generating devices may also be used to detect reciprocating movement of the flexible rod. For example, the plurality of apertures may be eliminated by using a linear or sliding potentiometer that may be coupled to the rod so that reciprocating movement of the rod actuates the potentiometer. The output from the potentiometer may be coupled to another of the A/D inputs of the microcomputer 46.

In general, it will be recognized that the attachment portion 24 of the orientation sensors may be attached to a relatively non-movable portion of the person which may be in an area other than the torso or upper body. For example, a user may attach the attachment portion 24 to a shoulder blade area or side of the arm where the side of the arm does not move with respect to the head. In addition, it will be recognized that the terminology used herein of "attaching to a non-movable portion" of the user includes attachment to clothing or outer covering or other surface which remains substantially fixed relative to the movement of the user's head. Therefore, a shoulder harness may also serve as a suitable attachment portion as shown in FIG. 7 for the orientation sensor 102.

Also, it will be recognized that yet another method for determining the boundary or range values of the total lateral movement of a user may be based on a priori knowledge of a statistically determined angle displacement range. For example, it may be determined that a typical user has a total angular displacement of 120°, as a result, a user may forego the range setting process of activating the push button since the computer knows the range. Therefore, the computer may assume that the boundary values lie 120° apart where the center value lies at the 60° value.

The Appendix is a code listing of a program for use by the microcomputer 46 of FIG. 3 to determine lateral head orientation in accordance with the method described with reference to FIG. 5. The head orientation data is transmitted over the RS-232 interface in a format which emulates a Microsoft TM mouse for an IBM PC TM compatible computer. This listing contains material which is subject to copyright protection.

Specific embodiments of novel methods and apparatus for head tracking has been described for the purposes of illustrating the manner in which the invention may be used and made. It should be understood that the implementation of other variations and modifications of the invention in its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

| APPENDIX | | | |
| --- | --- | --- | --- |
| PORTA | EQU | $1000 | ;Address of port A |
| PORTB | EQU | $1004 | ;Address of port B |
| DDRD | EQU | $1009 | ;PORTD data direction register |
| PACTL | EQU | $1026 | ;port A control register |
| SPCR | EQU | $1028 | ;spi control register |
| BAUD | EQU | $102B | ;baud set register |

APPENDIX -continued

| | | | |
|---|---|---|---|
| SCCR1 | EQU | $102C | ;serial ctl register 1 |
| SCCR2 | EQU | $102D | ;serial ctl register 2 |
| STAT | EQU | $102E | ;SCI status register |
| DATA | EQU | $102F | ;serial data register |
| ADCTL | EQU | $1030 | ;Address of A to D control register |
| ADR1 | EQU | $1031 | ;A to D register 1 |
| ADR2 | EQU | $1032 | ;A to D register 2 |
| ADR3 | EQU | $1033 | ;A to D register 3 |
| ADR4 | EQU | $1034 | ;A to D register 4 |
| OPTION | EQU | $1039 | ;OPTION control register |

*User data RAM definitions

| | | | |
|---|---|---|---|
| CENTER | EQU | $0057 | ;reading with tracker centered |
| LEFT | EQU | $0058 | ;reading with tracker all the way left |
| RIGHT | EQU | $0059 | ;reading with tracker all the way right |
| CONTR | EQU | $005A | ;controller reading |
| OLD | EQU | $005B | ;last tracker reading |
| CURRENT | EQU | $005C | ;current tracker reading |
| DIFFLH | EQU | $005D | ;center-left voltage difference MSB |
| DIFFL | EQU | $005E | ;LSB |
| CLICKSLH | EQU | $005F | ;high byte-left clicks/ sample quantization word |
| CLICKSL | EQU | $0060 | ;low byte of the left clicks word |
| CLICKSRH | EQU | $0061 | ;high byte - right clicks/ sample quantization word |
| CLICKSR | EQU | $0062 | ;low byte of the right clicks word |
| BYTE1 | EQU | $0063 | ;first byte in transmit trio |
| BYTE2 | EQU | $0064 | ;second byte in transmit trio |
| BYTE3 | EQU | $0065 | ;third byte in transmit trio |
| DIFFRH | EQU | $0066 | ;right-center voltage difference MSB |
| DIFFR | EQU | $0067 | ;LSB |
| DELTAX | EQU | $0068 | ;change in X |
| DELTAYH | EQU | $0069 | |
| DELTAY | EQU | $006A | ;change in Y |

*Port A: bit 0 = data, bit 4 = clock, bit 5 = latch

| | | | |
|---|---|---|---|
| CDATA | EQU | $01 | ;controller data bit |
| CCLOCK | EQU | $10 | ;controller clock high |
| CLATCH | EQU | $20 | ;controller latch high |
| CCL | EQU | $30 | ;controller clock and latch high |
| HALFSCN | EQU | $0200 | |
| CMOVE | EQU | $20 | |
| | ORG | $B600 | ;start program here |
| INIT | LDAA | #$10 | |
| | STAA | PORTB | ;disable TxD, RxD connection |
| | LDAA | #$00 | ;load a with zero |
| | STAA | DIFFLH | ;zero out diffH |
| | STAA | DIFFRH | |
| | STAA | SCCR1 | |
| | STAA | PACTL | ;zero out port A control register |
| | LDAA | #$90 | ;load 90hex into a |
| | STAA | OPTION | ;start up a/d charge pump, set delay bit |
| | LDAA | #$33 | |
| | STAA | BAUD | ;set baud to 1200 for 8MHz clock |
| | LDAA | #$01 | |
| | STAA | DDRD | |
| | LDAA | #$08 | |
| | STAA | SCCR2 | ;enable transmit |
| | LDAB | M | |
| | BSR | TBJ | ;transmit capital M for Microsoft! |
| START | LDAA | #$10 | ;load a with zero |
| | STAA | PORTB | ;init port b (leds) to 0 |
| | LDAA | #$11 | |
| | STAA | PORTB | ;light led for left init |
| | BSR | STCHJ | ;wait for switch |
| | BSR | SMPLJ | ;sample current tracker reading |
| | STAA | LEFT | ;store the tracker reading for left |
| | LDAA | #$12 | |
| | STAA | PORTB | ;light led for right init |
| | BSR | STCHJ | ;wait for switch |
| | BSR | SMPLJ | ;sample current tracker reading |
| | STAA | RIGHT | ;store tracker reading for right |
| | LDAA | #$14 | |
| | STAA | PORTB | ;light led for center init |
| | BSR | STCHJ | ;wait for switch |
| | BSR | SMPLJ | ;sample current tracker reading |
| | STAA | CENTER | ;store the tracker reading for center |
| | STAA | OLD | ;initialize last tracker value with the center |
| | SUBA | LEFT | ;calculate voltage diff from center to left |

-continued
APPENDIX

|  |  |  |  |
|---|---|---|---|
|  | STAA | DIFFL | ;store the left difference |
|  | LDAA | RIGHT | ;load in value for right |
|  | SUBA | CENTER | ;calculate voltage diff from right to center |
|  | STAA | DIFFR | ;store the right voltage difference |
|  | LDD | #HALFSCN | ;load double with half screen width |
|  | LDX | DIFFLH | ;load x with difference center to left |
|  | IDIV |  | ;calculate the number of clicks per quantization |
|  | STX | CLICKSLH | ;store result into clicks left |
|  | LDD | #HALFSCN | ;load double with half screen width |
|  | LDX | DIFFRH | ;load x with difference right to center |
|  | IDIV |  | ;calculate clicks per quantization right |
|  | STX | CLICKSRH | ;store result in clicks right |
|  | LDAA | #$17 |  |
|  | STAA | PORTB | ;turn on all the lights |
| NOW | BSR | SMPLJ | ;get the current tracker reading |
|  | STAA | CURRENT | ;store it in current |
|  | CMPA | CENTER | ;compare it to the center |
|  | BPL | RZONE | ;if it is right of center, go to the right zone |
|  | LDAB | OLD | ;load in the old value |
|  | CMPB | CENTER | ;compare it to the center |
|  | BPL | LEXPT | ;if it is right of center, go to the left exception |
|  | SBA |  | ;subtract accumulators |
|  | LDAB | CLICKSL | ;load the number of clicks left |
|  | MUL |  | ;calc change in X, result in B acc. |
|  | JMP | XUP |  |
| LEXPT | SUBA | CENTER | ;subtract current from center |
|  | LDAB | CLICKSL | ;load in clicks left constant |
|  | MUL |  | ;calc clicks for this half |
|  | STAB | DELTAX | ;store the interim value |
|  | LDAA | CENTER | ;load in center |
|  | SUBA | OLD | ;subtract the OLD |
|  | LDAB | CLICKSR | ;load in the clicks R constant |
|  | MUL |  | ;calc clicks for this half |
|  | ADDB | DELTAX | ;add in the first half, leave result in ACC B |
|  | JMP | XUP |  |
| STCHJ | JMP | STCH |  |
| SMPLJ | JMP | SMPLE |  |
| TBJ | JMP | TB | ;jump point to eliminate jump too far error |
| RZONE | LDAB | OLD |  |
|  | CMPB | CENTER |  |
|  | BLO | REXPT |  |
|  | SBA |  |  |
|  | LDAB | CLICKSR |  |
|  | MUL |  |  |
|  | JMP | XUP |  |
| REXPT | SUBA | CENTER |  |
|  | LDAB | CLICKSR |  |
|  | MUL |  |  |
|  | STAB | DELTAX |  |
|  | LDAA | CENTER |  |
|  | SUBA | OLD |  |
|  | LDAB | CLICKSL |  |
|  | MUL |  |  |
|  | ADDB | DELTAX |  |
| XUP | STAB | DELTAX | ;store the updated tracker reading |

*This section reads in the NINTENDO controller and sets the delta values accordingly. The byte read
*from the controller is in the following format:
*bit    7        6       5       4       3       2       1       0
*       A but.          B but.  Sel.    Start   Up      Down    Left    Right
*The left and right readings are reversed to reflect the reversed display present in the headset.

|  |  |  |  |
|---|---|---|---|
|  | BSR | GETC | ;get current controller reading |
|  | BITA | #$80 |  |
|  | BEQ | CT2 | ;if the A button isn t pushed, go on |
|  | BSET | BYTE1 $20 | ;set left mouse button active |
| CT2 | BITA | #$04 |  |
|  | BEQ | CT3 | ;if the UP arrow isn t pushed, go on |
|  | LDAB | #CMOVE |  |
|  | STAB | DLETAY | ;make the DELTA Y value equal to one click left |
| CT3 | BITA | #$08 |  |
|  | BEQ | CT4 | ;if the DOWN arrow isn t pushed, go on |
|  | LDAB | #$00 |  |
|  | SUBB | #CMOVE |  |
|  | STAB | DELTAY | ;make the DELTA Y value equal to −1*click left |
| CT4 | BITA | #$01 |  |
|  | BEQ | CT5 | ;if the right arrow isn t pushed, go on |
|  | LDAB | DELTAX |  |
|  | SUBB | #CMOVE |  |

APPENDIX -continued

|  |  |  |  |
|---|---|---|---|
|  | STAB | DELTAX | ;take a left click away from DELTA X |
| CT5 | BITA | #$02 |  |
|  | BEQ | CT6 | ;if the left arrow isn t pushed, go on |
|  | LDAB | DELTAX |  |
|  | ADDB | #CMOVE |  |
|  | STAB | DELTAX | ;add a left click to DELTA X |
| CT6 | BITA | #$40 |  |
|  | BEQ | FORM |  |
|  | BSET | BYTE1 $10 |  |

*This portion of the code formats the delta X and Y data for transmission in the three byte packet
*required by the Microsoft mouse driver.
*Byte 1:  x  1  LB  RB  Y7 Y6 X7 X6
*Byte 2:  x  0  X5  X4  X3 X2 X1 X0
*Byte 3:  x  0  Y5  Y4  Y3 Y2 Y1 Y0
*The mouse expects 1200 7N1 for the RS-232 connection. This program generates an effective
*7N2 by setting the MSB of each byte to 1. The driver is fooled and sees 7N2 as 7N1.

| FORM | LDD | DELTAYH | ;get change in Y |
|---|---|---|---|
|  | LSLD |  |  |
|  | LSLD |  | ;shift bits 7 and 6 into ACC A |
|  | LDAB | DELTAX | ;get change in X |
|  | LSLD |  |  |
|  | LSLD |  | ;shift bits 7 and 6 into ACC A |
|  | ORAA | BYTE1 | ;make sure controller button is included |
|  | TAB |  | ;move from A to B to ready for transmit |
|  | ORAB | #$40 | ;set clock bit for start of 3 byte packet |
|  | BSR | TBJ | ;transmit first byte |
|  | LDAB | DELTAX | ;get change in X |
|  | ANDB | #$3F | ;mask off top two bits |
|  | BSR | TBJ | ;transmit second byte |
|  | LDAB | DELTAY | ;get change in Y |
|  | ANDB | #$3F | ;mask off top two bits |
|  | BSR | TBJ | ;transmit third byte |
|  | LDAA | CURRENT |  |
|  | STAA | OLD | ;set current to old |
|  | JMP | NOW | ;do it all again! |

*This subroutine samples the switch status attached to port A bit ONE. First the routine
*waits for the switch to be depressed and then waits again until it is released.

| STCH | LDAA | #$02 | ;load in the mask for the switch |
|---|---|---|---|
|  | ANDA | PORTA | ;test if the first bit in port A is high |
|  | BEQ | STCH | ;not set to 1. do it again |
|  | LDX | #$FFFF | ;load count index into X for debounce delay |
| CNT | DEX |  | ;decrement X by 1 |
|  | BNE | CNT | ;if you haven t reached zero, go back |
|  | LDX | #$FFFF | ;load count index into X for debounce delay |
| CNT1 | DEX |  | ;decrement X by 1 |
|  | BNE | CNT1 | ;if you haven t reached zero, go back |
|  | RTS |  | ;it is back to zero again, go back |

*This subroutine samples the current voltage from the tracker potentiometer and leaves it in
*the accumulator. OK!

| SMPLE | LDAA | #$10 | :set AD control to sample lower 4 channels |
|---|---|---|---|
|  | STAA | ADCTL |  |
| NTDN1 | LDAA | ADCTL | ;test if CCF is set (done sampling) |
|  | BPL | NTDN1 | ;go back if it isn .t done |
|  | LDAA | ADR1 | ;put sample into the accumulator |
|  | RTS |  | ;done sampling bank, go back |

*This subroutine gets the data from the nintendo controller and leaves it in ACC A OK!

| GETC | LDAB | #CCLOCK | :clock high, latch low |
|---|---|---|---|
|  | STAB | PORTA |  |
|  | LDAB | #CCL | ;clock high, latch high |
|  | STAB | PORTA |  |
|  | NOP |  | ;delay 3uS |
|  | NOP |  |  |
|  | NOP |  |  |
|  | LDAB | #CCLOCK | ;clock high, latch low |
|  | STAB | PORTA |  |
|  | LDX | #8 | ;load X with 8 |
| GETCL | LSLA |  | ;shift the A acc left |
|  | LDAB | PORTA | ;read in port A |
|  | ANDB | #CDATA | ;get only the data bit |
|  | ABA |  | ;add it to the A acc |
|  | LDAB | #00 |  |
|  | STAB | DELTAY | ;zero out DELTA Y for this iteration |
|  | STAB | DELTAYH |  |

-continued
APPENDIX

```
         STAB    BYTE1           ;zero out BYTE 1 for this iteration
         STAB    PORTA           ;drop the clock
         LDAB    #CCLOCK         ;raise the clock
         STAB    PORTA
         DEX                     ;decrement the number of bits to go
         BNE     GETCL           ;if it isn't zero, go back for more
         COMA                    ;invert byte - buttons are read active low
         RTS

*this subroutine takes the ascii value in ACC B and transmits it at 7N2(1) OK!

TB       LDAA    STAT            ;test if TDRE is set (transmit empty)
         BPL     TB
         ORAB    #$80            ;make format 7N2
         STAB    DATA            ;transmit
         RTS

M        FCB     'M'
```

What is claimed is:

1. A device for determining an orientation of at least a portion of a living body comprising:

housing means for attachment to a movable portion of the body; and means, operatively connected to said housing means, for sensing the relative movement between said movable portion and another portion of the body, said sensing means having mechanical linkage means and position signal generating means adapted to generate a signal in response to movement of said mechanical linkage means, wherein said mechanical linkage means is adapted to respond to relative movement between said movable portion and said other portion of the body, said mechanical linkage means including a reciprocable member having a portion adapted for attachment to said other portion of the body and connector means adapted to slidably receive said reciprocable member, for moving in response to reciprocal movement of said reciprocable member so as to actuate said position signal generating means in response to movement of said movable portion of the body.

2. The device of claim 1 wherein said housing means is comprised of a headset adapted to receive a user's head.

3. The device of claim 2 wherein said headset comprises a visor adapted to house a video display device.

4. The device of claim 1 wherein said mechanical linkage means is comprised of attachment means for coupling to said other portion of the object.

5. The device of claim 1 wherein said position signal generating means is comprised of variable impedance means which generates a signal corresponding to a current impedance value which changes in response to movement of said movable portion of the body.

6. The device of claim 1 wherein said position signal generating means operatively couples to computing means which receives said signal to determine the orientation of said movable portion of the body.

7. The device of claim 5 wherein said connector means rotatably connects to said variable impedance means and slidably receives said reciprocable member to facilitate reciprocating movement of said reciprocable member during movement of said movable portion of the body.

8. The device of claim 6 wherein said computing means operatively couples to an image generating device and generates an object position signal corresponding to a current position of the movable portion of the object for use by said image generating device.

9. The device of claim 7 further comprising another signal generating means for detecting reciprocating movement of said reciprocable member.

10. A device for determining an orientation of at least a portion of a living body comprising:

housing means for attachment to a movable portion of the body;

first sensing means, connected to said housing means and adapted for attachment to another first portion of the body, said sensing means including first means for indicating relative movement between said movable portion and said first portion; said first means for indicating relative movement having a first flexible member with a portion adapted for attachment to said first portion of the body and also having first connector means adapted to operatively couple with another portion of said first flexible member so as to be movable in response to movement of said movable portion of the body;

second sensing means, connected to said housing means and adapted for attachment to another second portion of the body, said second sensing means including second means for indicating relative movement between said movement portion and said second portion; said second means for indicating relative movement having a second flexible member having a portion adapted for attachment to said second portion of the body and also having second connector means adapted to operatively couple with another portion of said second flexible member so as to be movable in response to movement of said movable portion of the body;

wherein each of said first and second sensing means further comprises position signal generating means adapted to operatively connect with said corresponding connector means such that movement of said movable portion of the body causes said first and second flexible members to operatively engage said first and second connector means and actuate each of said respective position signal generating means; and computing means, operatively connected to both first and second sensing means, for determining both lateral displacement and vertical displacement of said movable portion of the body in response to position signals from said first and second sensing means.

11. The device of claim 10 wherein said housing means is comprised of a headset adapted to receive a user's head.

12. The device of claim 11 wherein said headset comprises a visor adapted to house a video display device.

13. The device of claim 12 wherein said first and second sensing means are opposedly mounted proximate said visor to facilitate connection of said first and second sensing means to the user's torso area.

14. The device of claim 10 wherein each of said corresponding conductor means rotatably connects to said corresponding variable impedance means and slidably receives said corresponding flexible member to facilitate reciprocating movement of said corresponding flexible members during movement of said movable portion of the object.

15. The device of claim 10 wherein each of said signal generating means is comprised of variable impedance means which generates a signal corresponding to a current impedance value which changes in response to movement of said movable portion of the object.

16. The device of claim 15 wherein each of said signal generating means operatively couples to computing means which receives said signals from said signal generating means, to determine the orientation of said movable portion of the object.

17. The device of claim 16 wherein said computing means operatively couples to an image generating device and generates an object position signal corresponding to a current position of the movable portion of the object for use by said image generating device.

18. A device for determining the orientation of an object comprising:
a headset including orientation sensor means for determining the angular displacement of a head relative to an upper body area of a headset user, said orientation sensor means having electromechanical linkage includes a reciprocable flexible member having a portion adapted for attachment to said upper body area, and connector means adapted to reciprocably couple with another portion of said reciprocable flexible member so as to be movable in response to movement of the head.

19. The device of claim 18 wherein said connector means includes a rotatably mounted sleeve member connected to a position signal generating device such that movement of said head causes said reciprocable flexible member to rotate said rotatable sleeve thereby actuating said signal generating device.

20. The device of claim 19 wherein said connector means is further adapted to allow said reciprocable flexible member to reciprocally move through said sleeve member when said head is moved in a substantially vertical position thereby reducing rotational movement of said sleeve during vertical motion.

21. The device of claim 18 further comprising computing means for determining the orientation of said head in response to an amount of movement of said connector means.

* * * * *

UNITED STATES PATENT AND TRADEMARK OFFICE
CERTIFICATE OF CORRECTION

PATENT NO. : 5,323,174  
DATED : June 21, 1994  
INVENTOR(S) : Klapman et al.

Page 1 of 2

It is certified that error appears in the above-indentified patent and that said Letters Patent is hereby corrected as shown below:

Column 1, line 29, replace the comma following "virtual reality" with a period.

Column 1, line 32, "virtual realty" should be --virtual reality--.

Column 3, line 10, "quantized" should be --quantitized--.

Column 3, line 51, the title "BRIEF DESCRIPTION OF THE DRAWING8" should be --BRIEF DESCRIPTION OF THE DRAWINGS--.

Column 4, line 12, "an" should be --a--.

Column 6, line 16, add a comma at the end of the line after "Motorola MC34164".

Column 8, line 53, "be" should be --to--.

Column 18, line 48, Claim 10, "movement" should be --movable--.

Column 19, line 13, Claim 14, "conductor" should be --connector--.

UNITED STATES PATENT AND TRADEMARK OFFICE
CERTIFICATE OF CORRECTION

PATENT NO. : 5,323,174
DATED : June 21, 1994
INVENTOR(S) : Klapman et al.

It is certified that error appears in the above-indentified patent and that said Letters Patent is hereby corrected as shown below:

Column 20, line 9, Claim 18, after "linkage" add --attachable to said upper body area wherein said electromechanical linkage--.

Signed and Sealed this

Twentieth Day of December, 1994

Attest:

BRUCE LEHMAN

Attesting Officer           Commissioner of Patents and Trademarks